United States Patent [19]

Tanaka

[11] Patent Number: 5,781,539
[45] Date of Patent: Jul. 14, 1998

[54] PAGING SYSTEM CAPABLE OF CALLING PAGERS OF DIFFERENT BIT RATES WITHOUT DETERIORATION OF AN EFFICIENT USE OF RADIO CHANNELS

[75] Inventor: Hironao Tanaka, Tokyo, Japan

[73] Assignee: NEC Corporation, Tokyo, Japan

[21] Appl. No.: 648,974

[22] Filed: May 17, 1996

[30] Foreign Application Priority Data

May 17, 1995 [JP] Japan ................................ 7-118544

[51] Int. Cl.$^6$ .................................. H04B 7/26; H04L 7/00
[52] U.S. Cl. .................... 370/312; 370/313; 370/328;
370/350; 370/512; 340/825.44; 455/31.2;
455/426; 455/524
[58] Field of Search ........................... 370/312, 313,
370/316, 321, 324, 328, 337, 347, 350,
465, 503, 512, 516; 340/825.44; 375/356,
362, 371, 373, 376; 455/13.1, 13.4, 31.2,
31.3, 422, 426, 427, 428, 430, 502, 503,
507, 515, 517, 524, 13.2

[56] References Cited

U.S. PATENT DOCUMENTS 5,363,377  11/1994  Sharpe ................................. 370/350
5,448,570   9/1995  Toda et al. ........................... 370/350
5,495,233   2/1996  Kawashima et al. ............. 340/825.44
5,663,715   9/1997  Godoroia .......................... 340/825.44

FOREIGN PATENT DOCUMENTS 6311088  11/1994  Japan.

Primary Examiner—Alpus H. Hsu
Attorney, Agent, or Firm—Sughrue, Mion, Zinn, Macpeak & Seas, PLLC

[57] ABSTRACT

A central station and each base station have a timer indicating time instants coincident with each other. A common transmission start time instant is provided from the central station to each base station so as to match the transmission start time instant to start transmission of the signal frame in each station. The central station makes the call requests of different bit rates contained in one signal frame and broadcasts to each station the transmission start time instant for the signal frame, the order of the call requests within the signal frame, and bit rate switch timings. When the transmission start time instant arrives, the base station reproduces call signals from the call requests in accordance with the designated order. Reproducing clock pulses are switched with reference to the bit rate switch timings sent from the central station. Thus, each station can transmit the call signals of the different bit rates in one signal frame with their phases coincident with each other.

5 Claims, 6 Drawing Sheets

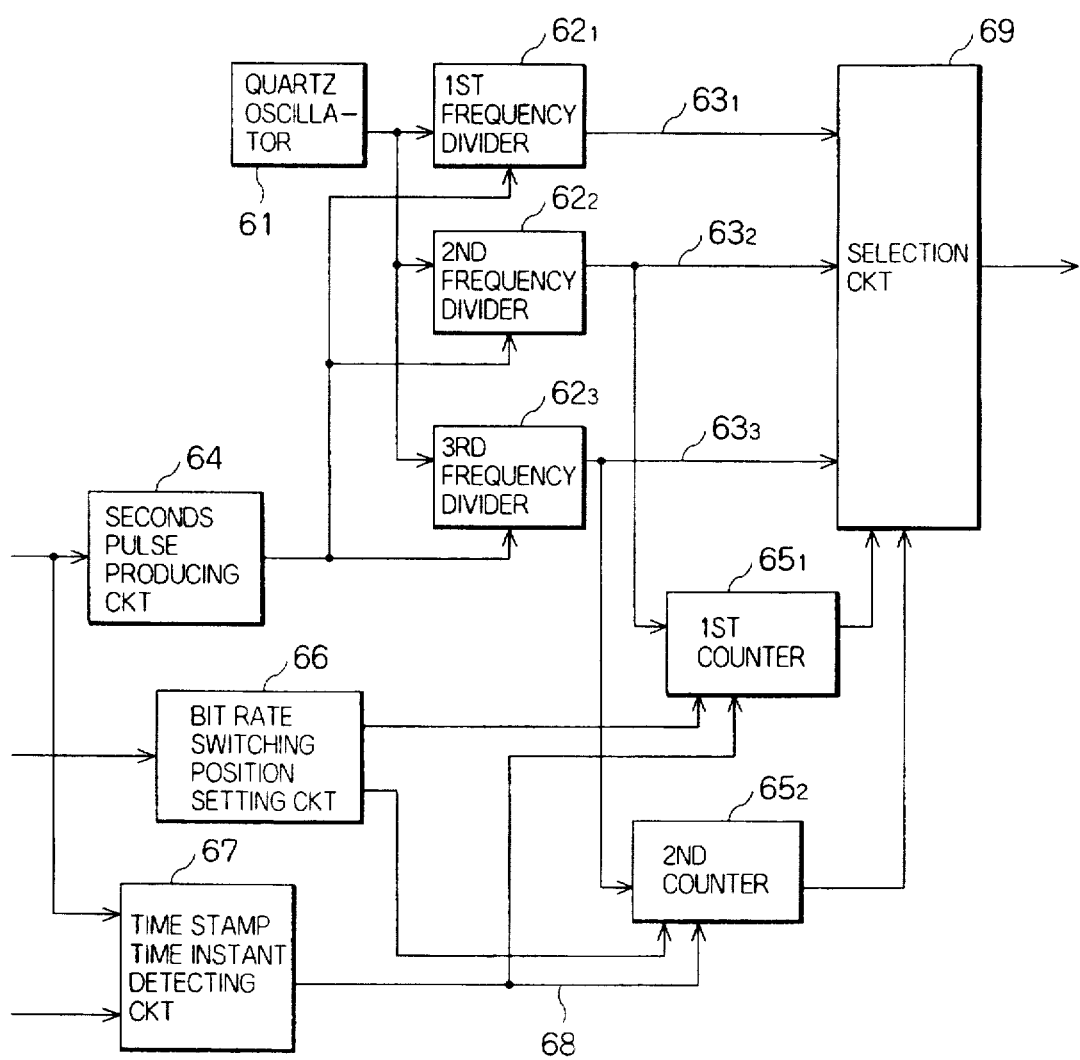

Fig. 7

| NUMBER | STATUS OF COUNTER | OUTPUT OF SELECTION CKT |
|---|---|---|
| 1 | 1ST COUNTER = COUNTING CONTINUED<br>2ND COUNTER = COUNTING CONTINUED | 1ST REPRODUCING CLOCK (OUTPUT OF 1ST FREQUENCY DIVIDER) |
| 2 | 1ST COUNTER = COUNTING COMPLETED<br>2ND COUNTER = COUNTING CONTINUED | 2ND REPRODUCING CLOCK (OUTPUT OF 2ND FREQUENCY DIVIDER) |
| 3 | 1ST COUNTER = COUNTING COMPLETED<br>2ND COUNTER = COUNTING COMPLETED | 3RD REPRODUCING CLOCK (OUTPUT OF 3RD FREQUENCY DIVIDER) |

Fig. 8

PAGING SYSTEM CAPABLE OF CALLING PAGERS OF DIFFERENT BIT RATES WITHOUT DETERIORATION OF AN EFFICIENT USE OF RADIO CHANNELS

BACKGROUND OF THE INVENTION

This invention relates to a paging system in which a telephone set connected to a public telephone network calls a call number assigned to each pager to thereby transmit a call signal through a radio channel in a service area for a predetermined time duration in order to call a desired pager, and, in particular, to the paging system for offering a service of calling pagers having different bit rates.

Examples of the conventional paging system of the type described are disclosed in Japanese Patent Prepublications Nos. 311088/1994 and 291713/1994.

As will later be described in more detail, the conventional paging system comprises a paging central station unit responsive to a call request from a public telephone network for converting the call request into a call signal having a predetermined format. The paging central station unit is connected to base station units. Each of the base station units transmits the call signal throughout each of their service areas which partially overlap each other to form an overlap service area. By transmitting the call signal from each of these base station units through a radio channel, a pager present within the service areas is called. Each pager is capable of receiving those call signals of a preselected bit rate.

In the conventional paging system, it is required to effectively use radio channels so as to call a greater number of pagers by the use of radio channels of a restricted number. To this end, the pagers are being replaced from those of the bit rate of 512 BPS (bit per second) to high-speed ones of the bit rate of 1200 BPS. Until all pagers have been replaced by such high-speed ones, low-speed and high-speed pagers coexist. Therefore, the base stations are required to transmit both a high-speed call signal and a low-speed call signal. As the bit rate becomes higher, the phases of the call signals transmitted from the different base stations must be matched with a higher accuracy. Such a higher accuracy can be achieved by the conventional paging systems disclosed in the Japanese Patent Prepublications Nos. 311088/1994 and 291713/1994. In the conventional paging systems, however, the call signals transmitted through the common radio channel have a single-kind bit rate. As a result, it is impossible to offer the service for both the low-speed and the high-speed pagers.

As a technique of transmitting call signals of different bit rates, it is proposed to assign each bit rate with a single radio channel. However, the call signals of the different bit rates are often unbalanced in their volumes and the frequency of occurrence of calls is varied with time. For example, a low-speed radio channel is often idle while a high-speed radio channel tends to suffer an overflow. Thus, the radio channels can not effectively be utilized. Alternatively, differing the bit rates of the call signals contained in each signal frame is considered. In this event, the signal frame inevitably has a fixed length defined by a queuing cycle of a POCSAG (Post Office Code Standardization Advisory Group) system. This results in occurrence of an idle time period in each signal frame due to variation in volume of the calls at each bit rate. Thus, effective use is still impossible.

A variable-length signal frame can be formed for each bit rate by the use of any other system except the POCSAG system. Even in this event, when the central station indicates the transmission start time instant for the signal frame, the transmission start time instant is designated by no more than a discrete unit on the order of seconds. In addition, various restrictions and limits are imposed upon reducing a gap time between one signal frame and another. When the signal frame is reduced in length in response to the traffic intensity at every bit rate, the signal frame becomes fragmentary with an increased ratio of the gap time. This results in a deteriorated efficiency of use of the radio channels.

SUMMARY OF THE INVENTION

It is therefore an object of this invention to provide a paging system capable of calling pagers of different bit rates with phases matched between different base stations without deteriorating an efficiency of use of radio channels Other objects of this invention will become clear as the description proceeds.

According to this invention, there is provided a paging system comprising: a central station which includes call request receiving means for receiving call requests for pagers using any of a plurality of predetermined bit rates; frame unit classifying means supplied with the call requests received by the call request receiving means for classifying the call requests into every unit to be contained in each signal frame as a transmission unit upon transmission of call signals for calling the pagers through a radio channel; intraframe order setting means supplied with those call requests to be contained in each signal frame for ordering those call requests within each signal frame in accordance with the order of the predetermined bit rates; bit rate switch timing calculating means for calculating, when the call signals corresponding to the call requests are produced in the order determined by the intraframe order setting means, a timing of transition of the bit rates for each transition point with a leading edge of the signal frame used as a reference point; timer means for delivering a current time instant; transmission start time setting means for setting, with reference to the current time instant delivered from the timer means, a transmission start time instant to start transmission of each signal frame through the radio channel; and call request information broadcasting means for broadcasting call request information including those call requests classified for each signal frame in correspondence to the order within the signal frame, the bit rate switch timing, and the transmission start time instant of the signal frame; and a plurality of base stations each of which includes call request information receiving means for receiving the call request information transmitted from the central station; clock signal producing means for producing clock signals having frequencies corresponding to the respective bit rates possibly used by the pagers; time instant signal producing means for producing a time instant signal coincident with the current time instant delivered from the timer means in the central station; clock signal switching means for switching the clock signals in accordance with the order of the predetermined bit rates to select a selected one, the switching operation being carried out every time when the bit rate switch timing indicated by the call request information comes with respect to a reference time point at which the time instant represented by the time instant signal produced by the time instant signal producing means coincides with the transmission start time instant represented by the call request information; call signal producing means for producing, when the time instant indicated by the time instant signal produced by the time instant signal producing means coincides with the transmission start time instant indicated by the call request information, the call signals corresponding to the respective call requests in accordance with the intraframe order represented by the call request information and by the use of the clock signal selected by the clock selecting means; and call signal transmitting means for transmitting, through the radio channel to the pagers, the call signals produced by the call signal producing means.

Each of the timer means and the time instant signal producing means may comprise satellite signal receiving means for receiving a satellite signal transmitted from an artificial satellite and containing time instant information, and time instant information extracting means for extracting the time instant information from the satellite signal received by the satellite signal receiving means.

The clock producing means may comprise reference clock producing means for producing a reference clock signal used as a reference, a plurality of frequency dividing means for frequency-dividing the reference clock signal at different dividing ratios corresponding to the bit rates, and reset means for simultaneously resetting the frequency dividing means at a predetermined interval with reference to the time instant information produced by the time instant signal producing means, the clock signals produced by the frequency dividing means being corrected in phase at the predetermined interval.

Each of the pagers may establish phase synchronization with the call signal by the use of a preamble signal, the bit rates possibly used by the pagers being selected at a ratio such that erroneous synchronization does not occur.

The transmission start time setting means select, as the transmission start time instant, a time instant which is calculated by adding to the current time instant a time duration longer than a sum of a signal propagation delay time required in signal transmission from the central station to each base station and a processing time required for each base station to reproduce the call signals from the call request information.

BRIEF DESCRIPTION OF THE DRAWINGS

FIG. 7 is a block diagram of a circuit structure of a reproducing clock producing section illustrated in FIG. 6;

FIG. 8 is a view for describing a relationship between a reproducing clock produced by a selection circuit illustrated in FIG. 7 and a status of a counting operation in first and second counters.

DESCRIPTION OF THE PREFERRED EMBODIMENTS

Figure 1:
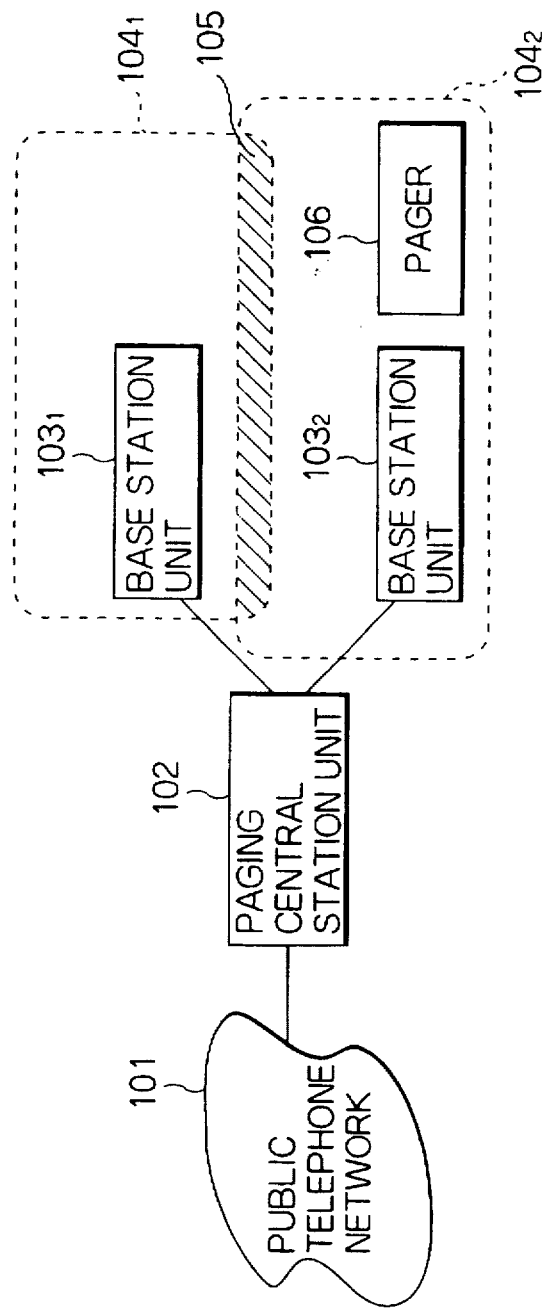
FIG. 1 is a view for describing a structure of a conventional paging system.

Referring now to FIG. 1, a conventional paging system will first be described for a better understanding of this invention.

In FIG. 1, the conventional paging system comprises a paging central station unit 102 responsive to a call request from a public telephone network 101 for converting the call request into a call signal having a predetermined format. The paging central station unit 102 is connected to base station units $103_1$ and $103_2$. Each of the base station units $103_1$ and $103_2$ transmits the call signal throughout each of their service areas $104_1$ and $104_2$ which partially overlap each other to form an overlap service area 105. By transmitting the call signal from each of these base station units through a radio channel, a pager 106 present within the service areas $104_1$ and $104_2$ is called. Each pager is capable of receiving those call signals of a preselected bit rate.

The call request from the public telephone network 101 is received by the paging central station unit 102 and subjected to format conversion into the call signal which is transmitted to the base station units $103_1$ and $103_2$. The call signal is transmitted from each of the base station units $103_1$ and $103_2$ through the common radio channel so as to call the pager which is present in any one of the service areas of the base stations. For example, when the pager 106 is present within the service area $104_2$ of the base station unit $103_2$, the pager produces a ringing tone in response to a radio wave transmitted from the base station unit $103_2$. Thus, in the paging system, the pager is called through the common radio channel from all of the base station units. It is therefore required to prevent an interference within the overlap area 105. For example, when the call signals transmitted from the base station units $103_1$ and $103_2$ are shifted in phase from each other, the pager present in the overlap area 105 can not normally be called with a high probability.

To enable the pager to normally receive the call signal even when the pager is present within the overlap area where the service areas of the adjacent base stations overlap each other, proposals have been made of various techniques to match the phases of the call signals transmitted from the different base stations.

As described in the background of the instant specification, Japanese Patent Prepublication No. 311088/1994 discloses a paging system in which each base station receives a phase compensation signal transmitted through a radio channel from a phase reference station and adjusts a transmission timing in the base station. Thus, phase synchronization is established between the call signals.

On the other hand, Japanese Patent Prepublication No. 291713/1994 discloses another paging system in which phase synchronization is established between call signals transmitted from different base stations by the use of a high-accuracy time instant signal obtained from a GPS (Global Positioning System) satellite. In this paging system, each of a central station and the base stations is provided with a GPS receiver. With reference to the signal from the satellite, a time instant signal of a coincident timing is produced in each station. The central station delivers the call signal to each base station with an indication of a transmission start time instant. The transmission start time instant is a delayed time instant delayed by a time duration longer than a sum of a maximum transmission time required for transmission of the call signal to each base station and a maximum processing time required for each base station to start transmission of the call signal through the radio channel. Each base station queues a plurality of call signals supplied from the central station and starts transmission of each call signal at the indicated time instant with reference to the high-accuracy time instant signal prepared by the GPS satellite. Since the high-accuracy time instant signal prepared by the GPS satellite is relied upon, it is possible to match the timing of transmission of a signal frame from each base station.

In order to call a greater number of pagers by the use of radio channels of a restricted number, it is required to effectively use the radio channels. To this end, the pagers are being replaced from those of the bit rate of 512 BPS (bit per second) to high-speed ones of the bit rate of 1200 BPS. Until all pagers have been replaced by such high-speed ones, low-speed and high-speed pagers coexist Therefore, the base stations are required to transmit both a high-speed call signal and a low-speed call signal. As the bit rate becomes higher, the phases of the call signals transmitted from the different base stations must be matched with a higher accuracy. Such a higher accuracy can be achieved by the prior art disclosed in Japanese Patent Prepublications Nos. 311088/1994 and 291713/1994. In the prior art, however, the call signals transmitted through the common radio channel have a single-kind bit rate. As a result, it is impossible to offer the service for both the low-speed and the high-speed pagers.

As a technique of transmitting call signals of a plurality of kind of bit rates, it is proposed to assign each bit rate with a single radio channel. However, the call signals of the different bit rates are often unbalanced in their volumes and the frequency of occurrence of calls is varied with time. For example, a low-speed radio channel is often idle while a high-speed radio channel tends to suffer an overflow. Thus, the radio channels can not effectively be utilized. Alternatively, it is considered to differ the bit rates of the call signals contained in each signal frame. In this event, the signal frame inevitably has a fixed length defined by a queing cycle of the aforesaid POCSAG system. This results in occurrence of an idle time period in each signal frame due to variation in volume of the calls at each bit rate. Thus, effective use is still impossible.

A variable-length signal frame can be formed for each bit rate by the use of any other system except the POCSAG system. Even in this event, when the central station indicates the transmission start time instant for the signal frame, the transmission start time instant is designated by no more than a discrete unit on the order of seconds. In addition, various restrictions and limits are imposed upon reducing a gap time between one signal frame and another. When the signal frame is reduced in length in response to the traffic intensity at every bit rate, the signal frame becomes fragmentary with an increased ratio of the gap time. This results in a deteriorated efficiency of use of the radio channels.

Referring to FIGS. 2 to 9, description will proceed to a paging system according to an embodiment of this invention.

Figure 2:
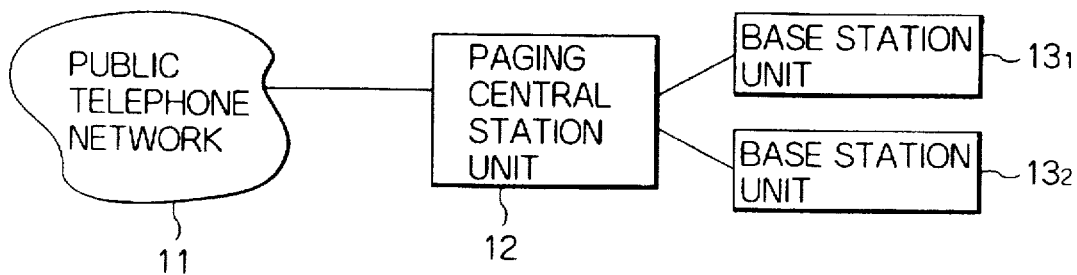
FIG. 2 is a view for describing a structure of a paging system according to an embodiment of this invention.

In FIG. 2, the paging system comprises a public telephone network 11, a paging central station unit 12 for receiving call requests, and base station units $13_1$ and $13_2$ for transmitting call signals through a radio channel to pagers which are not illustrated in the figure. The call requests from the public telephone network 11 are received by the paging central station unit 12 and converted into digital call signals of a predetermined format to be transmitted to the base station units $13_1$ and $13_2$. The call signals are converted at the base station units $13_1$ and $13_2$ into analog signals which are then transmitted through a common radio channel. In this embodiment, it is possible to transmit the call signals of three kinds of bit rates.

In this paging system, each of the central station and the base stations produces a time instant signal in response to a radio wave transmitted from a GPS satellite. With reference to the time instant signal, each base station transmits the call signal at a transmission timing coincident with that in another base station. The call signals are transmitted from the base stations frame by frame. The call signals of the three kinds of the bit rates are made to coexist in a single signal frame in proportion to the traffic intensity at the respective bit rates.

Figure 3:
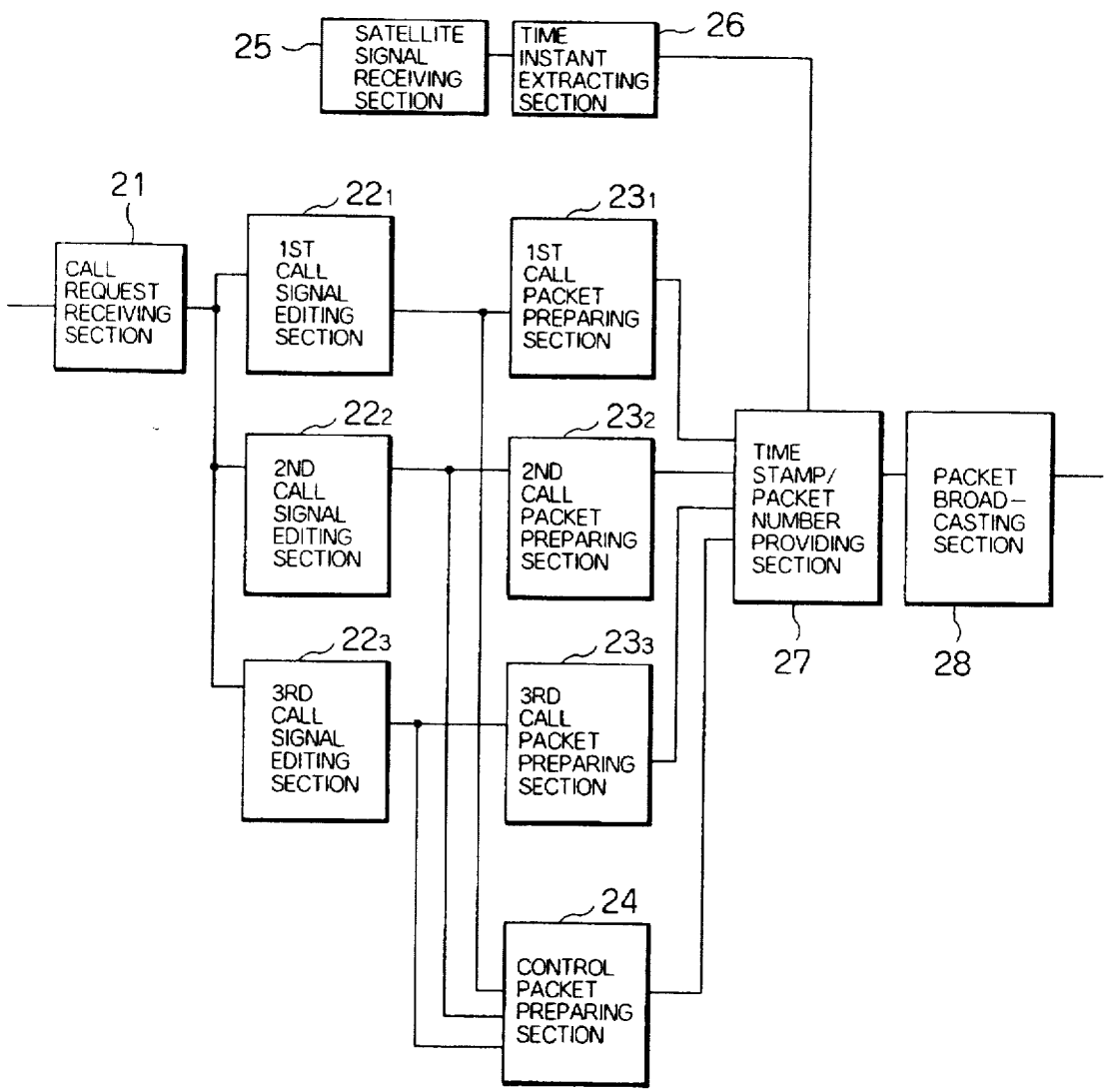
FIG. 3 is a block diagram of a structure of a paging central station unit illustrated in FIG. 2.

FIG. 3 schematically shows a structure of the paging central station unit illustrated in FIG. 1. The paging central station unit comprises a call request receiving section 21 for receiving the call requests from the public telephone network. The call request receiving section 21 has a function of distributing the call requests from the public telephone network to call signal editing sections corresponding to the different bit rates used by pagers to be called, respectively. Herein, one signal frame transmitted in the paging system has a length of 30 seconds. The call request receiving section 21 temporarily stops reception when the sum of the call requests which have been received reaches the length of one signal frame. The call requests present in the first through the third call signal editing sections $22_1$ to $22_3$ have a total length equal to or smaller than that of one signal frame.

Each of the first through the third call signal editing sections $22_1$ to $22_3$ is a circuit for converting the call requests from the public telephone network into the call signals of the POCSAG signal format, namely, a signal format which allows transmission through a radio channel. The first, the second, and the third call signal editing sections $22_1$, $22_2$, and $22_3$ correspond to the first, the second, and the third bit rates, respectively. Each of first through third call packet preparing sections $23_1$ to $23_3$ is a circuit for converting the call signal into a layer-3 packet. A control packet preparing section 24 is a circuit for preparing a packet which carries information indicative of timings to switch the bit rates within one signal frame.

A satellite signal receiving section 25 is a circuit for receiving the radio wave from the GPS satellite. The satellite signal which has been received is supplied to a time instant extracting section 26. The time instant extracting section 26 is a circuit for preparing a high-accuracy time instant signal with reference to the satellite signal. The call packets produced by the first through the third call packet preparing sections $23_1$ to $23_3$ and the control packet from the control packet preparing section 24 are supplied to a time stamp/packet number providing section 27. The time stamp/packet number providing section 27 is also supplied with the time instant signal from the time instant extracting section 26. The time stamp/packet number providing section 27 calculates a transmission start time instant to transmit each signal frame from the base station, and writes the transmission start time instant in a predetermined field in the packet. The time stamp/packet number providing section provides each packet to be transmitted with a packet number for indicating the order from the top within one signal frame.

The packet with the transmission start time information and the packet number recorded by the time stamp/packet number providing section 27 is supplied to a packet broadcasting section 28. The packet broadcasting section 28 prepares replicas of the packet for transmission to the base stations.

Figure 4:
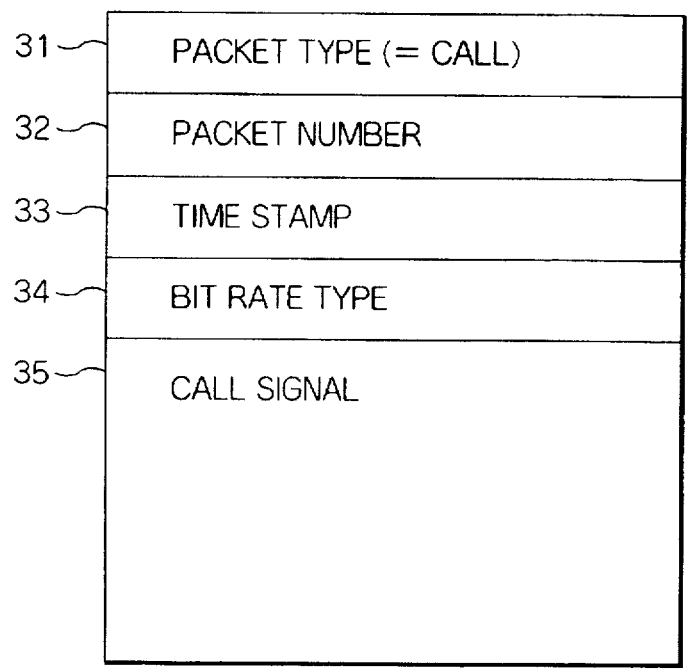
FIG. 4 is a view for describing a field structure of a call packet prepared by a call packet preparing section.

FIG. 4 shows a field structure of the call packet prepared by the call packet preparing section. The call packet is a layer-3 packet. A packet type field 31 is a field representative of the type of information contained in the packet. Herein, information representing that the packet carries the call signal is recorded in this field. For convenience of illustration, this Information is simply labelled "CALL" in the figure. A packet number field 32 represents the order from the top within one signal frame. A time stamp field 33 represents the time instant to start transmission of the signal frame containing the call signal. The same transmission start time instant is recorded in those packets to be processed in the same signal frame. A bit rate type field 34 represents the bit rate for use in reproducing the call signal into the analog signal.

A call signal field 35 is a field for registration of a subscriber number of the pager to be called and a message to be sent to the pager. The number of the pagers to be called is varied in correspondence to the number of the call requests received at the particular bit rate in consideration. For effective transmission between the central station and the base stations, the length of the packet is determined in dependence upon channel quality of the transmission path to be used. One signal frame transmitted from the base station has a length of 30 seconds. Generally, the call signals at each bit rate are separately carried by a plurality of the packets For example, the call signals at the first bit rate are sometimes distributed to ten packets. The packet numbers represent the order of those packets within one signal frame. By the use of the packet numbers, the call signals can be arranged at each base station in the same order within the signal frame.

Figure 5:
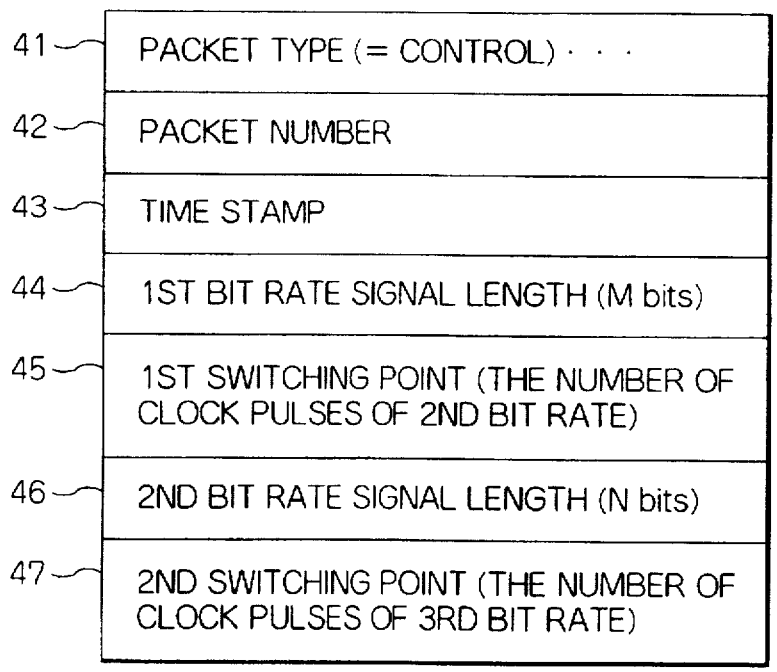
FIG. 5 is a view for describing a field structure of a control packet prepared by a control packet preparing section.

FIG. 5 shows a field structure of the control packet prepared by the control packet preparing section. A packet type field 41 has a value representing that the packet carries control information. This information is labelled "CONTROL" in the figure. A packet number field 42 is set at "1". This is because the information of the control packet is required at the base station before preparing one signal frame. A time stamp field 43 is given the same time instant as that recorded in the corresponding call packet. A first bit rate signal length field 44 represents the signal length for the first bit rate. The signal length is varied frame by frame in dependence upon the number of the pagers to be called at the first bit rate and the length of the messages to be sent to the pagers. Herein, the signal length for the first bit rate is equal to M bits (M being any positive integer).

A first switching point field 45 represents the timing to change clock pulses for use in reproducing the call signals into the analog signals from the first bit rate to the second bit rate. The first switching point field 45 is represented by the number of clock pulses counted at the second bit rate in the time duration from the leading edge of the signal frame to the switching position. A second bit rate signal length field 46 represents the signal length for the second bit rate. Herein, the signal length for the second bit rate is equal to N bits (N being any positive integer). A second switching point field 47 represents the timing to change the clock pulses for use in reproducing the call signals into the analog signals from the second bit rate to the third bit rate. The second switching point field 47 is represented by the number of clock pulses counted at the third bit rate in the time duration from the leading edge of the signal frame to the switching position.

Figure 6:
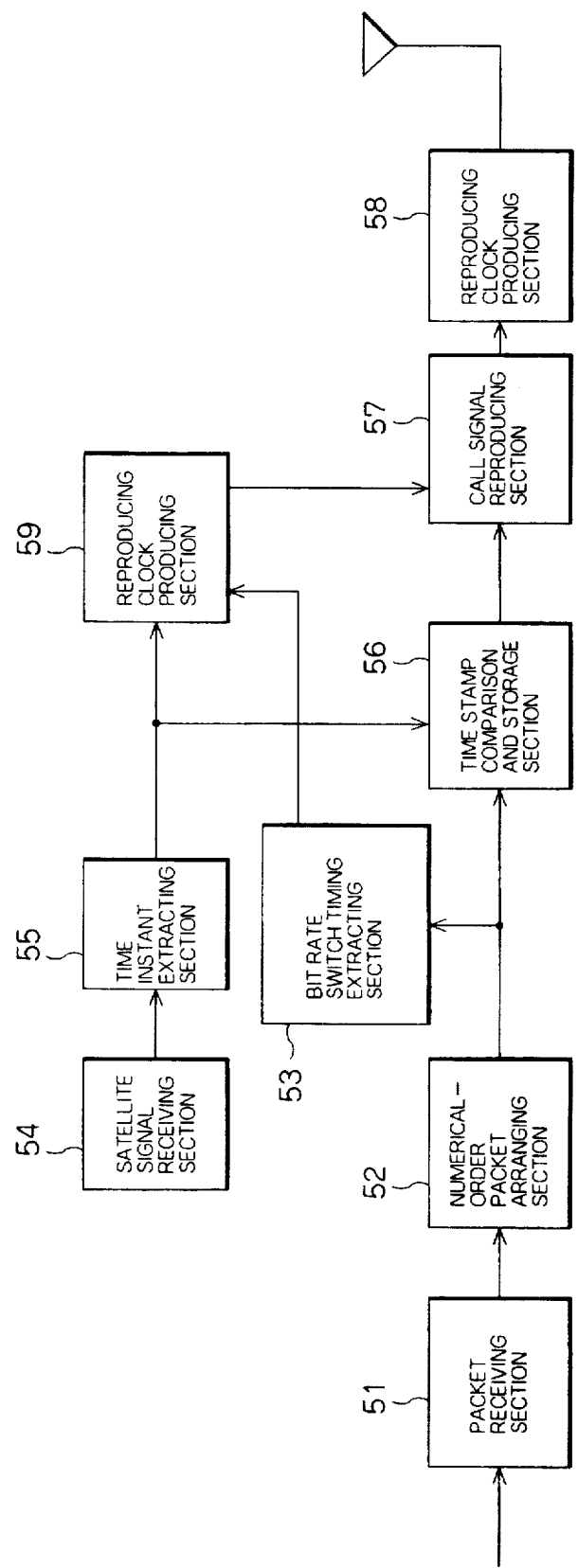
FIG. 6 is a block diagram of a structure of a base station illustrated in FIG. 2.

FIG. 6 schematically shows a structure of the base station illustrated in FIG. 1. The call packets and the control packet transmitted from the central station are received by a packet receiving section 51. A numerical-order packet arranging section 52 is a circuit for arranging the packets thus received in the order determined by the values of the packet number fields in the received packets. The arranging operation is carried out by collecting those packets having the same time stamp value. Thus, the packets are classified into units each of which Is to be contained in the same signal frame. In other words, the packets to be contained in the different signal frames are not mixed together. A bit rate switch timing extracting section 53 is a circuit responsive to the control packet for each signal frame for extracting the bit rate switch timing information and the time stamp contained therein.

A satellite signal receiving section 54 is a receiver circuit for receiving the signal sent from the artificial satellite. Time instant extracting means 55 is a circuit portion responsive to the satellite signal for producing a high-accuracy time instant signal. The satellite signal receiving section 54 and the time instant extracting section 55 of the base station are identical in specification with the satellite signal receiving section 25 and the time instant extracting section 26 of the central station, respectively, with the same artificial satellite system commonly used. Thus, it is possible to match the time instant signals obtained at the central station and all of the base stations.

A time stamp comparison and storage section 56 is a circuit for successively receiving the packets arranged in the order of the packet numbers to store the packets until a time instant at which a predetermined time duration is left before the time instant indicated by the time stamp recorded in each packet. At the time instant at which the predetermined time duration is left before the time instant indicated by the time stamp, the time stamp comparison and storage section successively transmits to a call signal reproducing section 57 a sequence of call packets forming a signal frame. The predetermined time duration corresponds to a signal preparation processing time required from the start of packet reproduction to the output of the signal from a call signal transmitting section 58. The transmission is carried out in the order starting from the call packet having a lowest number in the signal frame. The call signal reproducing section 57 is a circuit portion supplied with a reproducing clock signal from a reproducing clock producing section 58 for successively reproducing the packets sent from the time stamp comparison and storage section 56 into the analog call signals. The call signal transmitting section 58 is a transmitter circuit for transmitting the reproduced call signals through the radio channel to the service area assigned to the base station.

The reproducing clock producing section 59 is a circuit for producing the reproducing clock signal for use in reproducing the call signals as the analog signals. The reproducing clock producing section 59 is a circuit for switching, with reference to the switch timing information contained in the control packet, the reproducing clock signal from the first bit rate to the second bit rate and then to the third bit rate within one signal frame. Since the reproducing clock signal is switched within one signal frame as described above, the call signals of the different bit rates are allowed to coexist within each signal frame to be effectively reproduced.

FIG. 7 schematically shows a circuit structure of the reproducing clock producing section illustrated in FIG. 5. The reproducing clock producing section comprises a quartz oscillator 61 of a high accuracy. The quartz oscillator 61 has an oscillation frequency equal to an integral multiple of the least common multiple of the frequencies of the reproducing clock signals corresponding to the different bit rates. The quartz oscillator 61 produces an output signal which is supplied to first through third frequency dividers $62_1$ to $62_3$. The first frequency divider $61_1$ has a dividing ratio selected so that the output signal of the quartz oscillator 61 is frequency-divided to produce first reproducing clock pulses $63_1$ corresponding to the first bit rate. Likewise, the second frequency divider $62_2$ and the third frequency divider $62_3$ have dividing ratios selected so as to produce second and third reproducing clock pulses $63_2$ and $63_3$ corresponding to the second and the third bit rates, respectively.

The time instant signal from the time instant extracting section 55 in FIG. 5 is supplied to a seconds pulse producing circuit 64. The seconds pulse producing circuit 64 is a circuit responsive to the time instant signal for producing seconds pulses having a cycle of one second with an extremely high accuracy. Supplied with the seconds pulses, the first through the third frequency dividers $62_1$ to $62_3$ are simultaneously reset at every second. With this structure, the first through the third reproducing clock pulses $63_1$ to $63_3$ produced by the first through the third frequency dividers $62_1$ to $62_3$ are coincident in phase with the seconds pulses obtained from the satellite signal. Thus, the phases of the reproducing clock pulses in all base stations are corrected so as to coincide with one another with a very high accuracy.

A first counter $65_1$ counts the second reproducing clock pulses $63_2$ produced by the second frequency divider $62_2$. A second counter $65_2$ counts the third reproducing clock pulses $63_3$ produced by the third frequency divider $62_3$. A bit rate switching position setting circuit 66 initializes the first counter $65_1$ with a first switching point value obtained from the control packet. The bit rate switching position setting circuit also initializes the second counter $65_2$ with a second switching point value. A time stamp time instant detecting circuit 67 is a circuit for comparing the current time instant obtained from the time instant signal and a specific time instant which precedes, by the signal preparation processing time, the time instant indicated in the time stamp recorded in the packet. Upon coincidence between these time instants, a count enable signal 68 is supplied to the first and the second counters $65_1$ and $65_2$. A selection circuit 69 is a circuit for selecting, as an output signal, one of the first through the third reproducing clock pulses $63_1$ to $63_3$ produced by the first through the third frequency dividers $62_1$ to $62_3$ to supply the output signal to the call signal reproducing section.

FIG. 8 shows a relationship between the selected reproducing clock pulses produced by the selection circuit in FIG. 6 and the status of the counting operation in each of the first and the second counters. When both of the first and the second counters are engaged in the counting operation, the first reproducing clock pulses $63_1$ are selected as the output signal. When the first counter finishes the counting operation and the second counter is still engaged in the counting operation, the second reproducing clock pulses $63_2$ are selected. After completion of the counting operation in both of the first and the second counters, the third reproducing clock pulses are selected.

Figure 9:
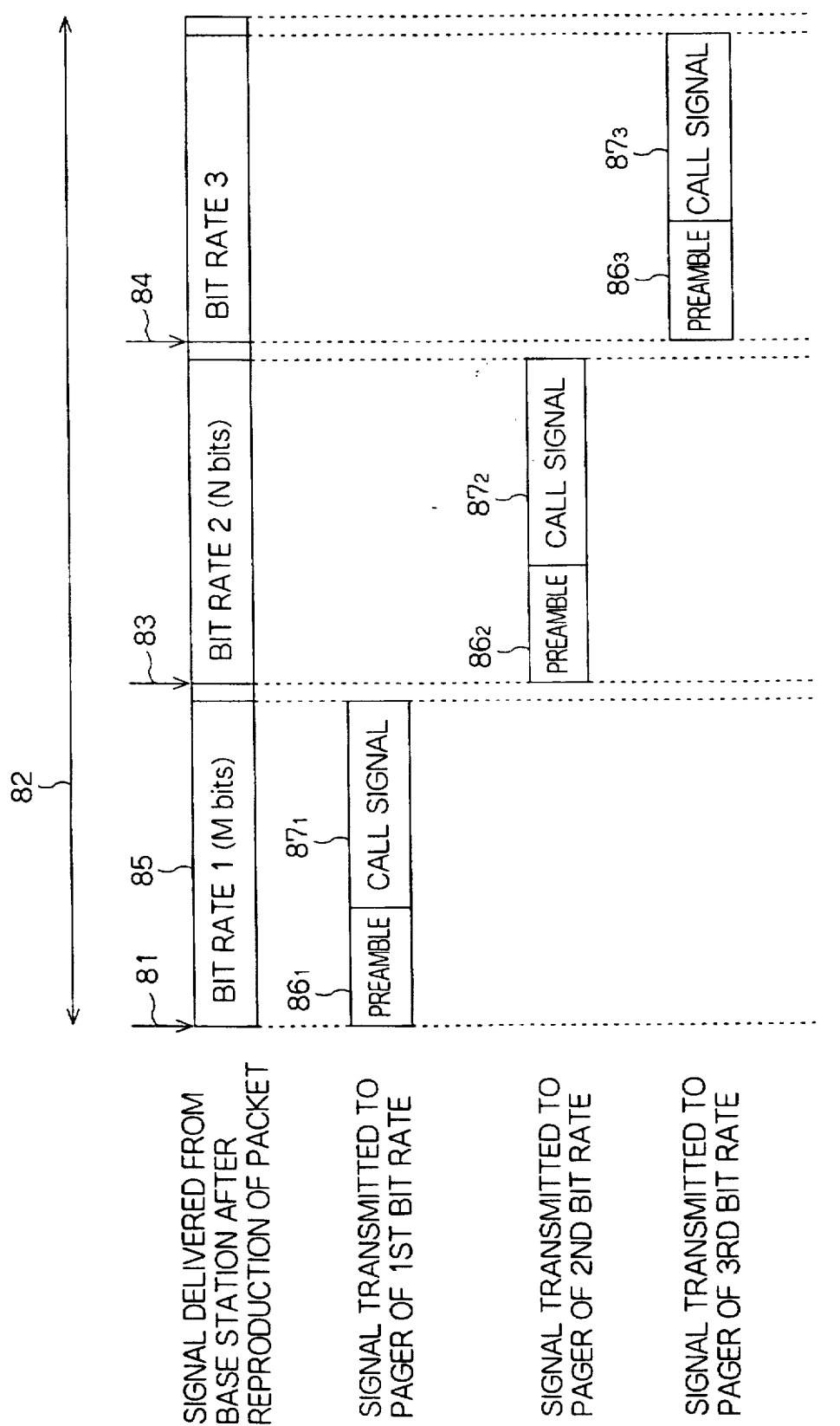
FIG. 9 is a view for describing an example of a content of a signal frame transmitted from the base station.

FIG. 9 shows an example of the content of the signal frame transmitted from the base station. In the figure, one signal frame transmitted from the base station is shown as a time chart thereof. A time instant $T_1$ represents a transmission start time instant at which a leading bit 81 of one signal frame is delivered. A time instant $T_7$ represents an end time instant of the signal frame. The one signal frame has a time period 82 between the time instant $T_1$ and the time instant $T_7$. An intermediate time instant $T_3$ in the one signal frame is a first switching point 83 at which the first bit rate is switched into the second bit rate. Another time instant $T_5$ of the one signal frame is a second switching point 84 at which the second bit rate is switched into the third bit rate. Specifically, each pager of the first bit rate is given a call service by a signal delivered from the base station between the time instants $T_1$ and $T_2$. Likewise, each pager of the second bit rate is given a call service by a signal delivered between the time instants $T_3$ and $T_4$ while each pager of the third bit rate is given a call service by a signal delivered from the base station between the time instants $T_5$ and $T_6$.

In the figure, a signal 85 of the first bit rate is composed of M bits. Transmission is started at the time instant $T_1$ and completed at the time instant $T_2$. A time duration from the leading edge 81 to the first switching point 83 corresponds to a counting period of counting the second reproducing clock pulses of a particular number which will be calculated in the following manner. Specifically, a transmission time $(T_2-T_1)$ required for transmission of the M bits at the first bit rate is divided by the cycle of the second reproducing clock pulses to produce a quotient, whose decimals are rounded up to produce an integer as the particular number. Therefore, an idle time period not longer than one of the second reproducing clock pulses is produced between the time instant $T_2$ and the time instant $T_3$. A time duration to the second switching point 84 corresponds to a counting period of counting the third reproducing clock pulses of a specific number which will be calculated in the following manner. Specifically, a sum $(T_4-T_1)$ of $(T_3-T_1)$ and $(T_4-T_3)$ required for transmission of N bits at the second bit rate is divided by the cycle of the third reproducing clock pulses to produce a quotient, whose decimals are rounded up to produce an integer as the specific number. Accordingly, a small idle time period is produced between the time instant $T_5$ of the second switching point 84 and the time instant $T_4$ of the end of the signal of the second bit rate. Likewise, an idle time period without any call signal is produced between the time instant $T_6$ and $T_7$.

The signals of the different bit rates are composed of preambles $86_1$ to $86_3$, which are for use in establishing phase synchronization of the signals, and call signals $87_1$ to $87_3$ at the different bit rates, respectively. Since the synchronization is established by the preambles as described above, bit rates of those pagers sharing the same radio channel must be selected so that the preamble signals are not erroneously synchronized with each other in a phase relationship based on their bit lengths. Specifically, the first through the third bit rates must be selected so that erroneous synchronization is not established with one another. For example, the first and the second bit rates are assumed to be equal to 512 BPS and 1024 BPS, respectively. In this event, the pager of 512 BPS may establish synchronization by the preamble of 1024 BPS because this bit rate is twice the former. In view of the above, the bit rates of the pagers sharing the common radio channel must be selected, for example, to be equal to 512 BPS and 1200 BPS so that the erroneous synchronization is not established by the preambles.

Now, description will proceed to the operation of the paging system in conjunction with the case where the signal frame illustrated in FIG. 9 is transmitted from the base station.

The call requests for calling the pagers are supplied from the public telephone network through the transmission paths to the paging central station unit. The call request receiving section 21 illustrated in FIG. 2 distributes the incoming call requests to the first through the third call request editing sections $22_1$ to $22_3$ in correspondence to the bit rates of the pagers to be called. As illustrated in FIG. 8, the radio channel for transmission from the base station is divided by a unit time corresponding to one signal frame having a predetermined time duration. The call request receiving section 21 classifies the call requests by every unit time corresponding to one signal frame so that the call requests are collected frame by frame. Specifically, the call request receiving section 21 calculates the time required for transmission of the distributed call requests and calculates the cumulative sum. Once the cumulative sum reaches the unit time, reception of the call requests incoming from the public telephone network is temporarily rejected.

Thus, the call requests classified into every unit to be contained in one signal frame are supplied to the first through the third call signal editing sections $22_1$ to $22_3$ in correspondence to the respective bit rates. The call signal editing sections convert the call requests of the respective bit rates into the signal formats of the POCSAG system for delivery to the first through the third call packet preparing sections $23_1$ to $23_3$. The first through the third call packet preparing sections $23_1$ to $23_3$ prepare the packets of a field structure illustrated in FIG. 4. In this stage, the packet type field 31, the bit rate type field 34, and the call signal field 35 are filled. The bit rate type field 34 carries a designation of the bit rate used in the base station when analog signals used as modulation input signals of the transmitter are reproduced from the packets.

The control packet preparing section 24 prepares the control packet of the field structure illustrated in FIG. 5. At first, from the call signals edited by the first through the third call signal editing sections $22_1$ to $22_3$, the signal lengths of M bits and N bits at the first and the second bit rates are obtained and recorded in proper positions in the control packet. Then, a time duration required for transmission of the signal of M bits at the first bit rate is calculated. The time duration is divided by the clock cycle of the second bit rate to obtain a quotient, whose decimals are rounded up to produce an integer. The integer is recorded as the first switching point. Likewise, another time duration required for transmission of the signal of N bits at the second bit rate is calculated and added to the time duration up to the first switching point. A resultant sum is divided by the clock cycle of the third bit rate to obtain a quotient, whose decimals are rounded up to produce another integer. This integer is recorded as the second switching point. At this stage, the packet number field and the time stamp field in the control packet are left vacant.

The call packet and the control packet thus prepared are supplied to the time stamp/packet number providing section 27 where the transmission start time instant to start transmission from the base station is recorded in the time stamp field. It is noted here that the same transmission start time instant is recorded in those packets to be composed in the base station into the same signal frame. The transmission start time instant recorded as the time stamp is determined taking into account the signal propagation delay time required for the packets to reach one of the base stations which is farthest from the central station, including retransmission of the packets. With reference to the time instant signal obtained from the satellite, the transmission start time instant is determined for every signal frame to be such a time instant that any of the base stations can simultaneously start transmission of the leading bit of every signal frame and that the waiting time from the call request to the actual call operation for the pagers is minimized. Every signal frame is allotted and recorded with the packet numbers representative of the order of arranging the packets. The packet numbers to be assigned are initialized at every signal frame. Herein, the control packet is assigned with a lowest number. Thereafter, the packets of the first bit rate, the second bit rate, and the third bit rate are successively numbered in this order.

The packets with the time stamps and the packet numbers recorded therein are transmitted through the packet broadcasting section 28 to each base station. The control packet is transmitted first in packet transmission between the central station and the base station frame by frame because the control packet must reach the base station before the transmission start time instant of each signal frame.

Supplied with the packets through the transmission path, the numerical-order packet arranging section (52 in FIG. 6) classifies them to form groups each containing those packets having the same time stamp. The packets thus classified are arranged in the order of the packet numbers. The control packet with the packet type "CONTROL" is transmitted to the bit rate switch timing extracting section 53. The packets with the packet type "CALL" are supplied to the time stamp comparison and storage section 56 in the order of arrangement.

In order that the transmission of the signal frame is started at the time instant $T_1$ as scheduled, the time stamp comparison and storage section 56 starts a reproducing operation of the call signal at the time instant preceding the time instant $T_1$ by a necessary processing time. Prior to start of the reproducing operation, the reproducing clock producing section 59 initializes the first counter ($65_1$ in FIG. 7) and the second counter $65_2$ with the values of the first and the second switching points read from the control packet, respectively. When the time instant $T_1$ has come, a counting operation is started. According to the rule illustrated in FIG. 8, the selection circuit 69 selects the reproducing clock to be delivered. Thus, the call signal is reproduced by the use of the first reproducing clock until the counting operation of the first counter $65_1$ is completed. After completion of the counting operation of the first counter $65_1$, the call signal is reproduced by the use of the second reproducing clock until the counting operation of the second counter $65_2$ is completed. After completion of the counting operation in both the first and the second counters $65_1$ and $65_5$, the call signal is reproduced by the use of the third reproducing clock.

As illustrated in FIG. 9, the call signal of M bits is delivered at the first bit rate to the pager of the first bit rate between the time instants $T_1$ and $T_2$. Likewise, the call signals are transmitted to the pagers of the second and the third bit rates between the time instants $T_3$ and $T_4$ and between the time instants $T_5$ and $T_6$, respectively. Short idle time periods are produced between the time instants $T_2$ and $T_3$, between the time instants $T_4$ and $T_5$, and between the time instants $T_6$ and $T_7$ when the bit rates are switched from one to another. However, such idle time periods result in no more than a very slight decrease in efficiency of use of the radio channel. On the other hand, the efficiency of use is remarkably improved because one signal frame is shared by the call signals of the different bit rates in correspondence to the traffic intensity.

As described above, the radio channel is effectively used because one signal frame carries the call signals of a plurality of the different bit rates. In addition, the positions of the first and the second switching points can be modified in correspondence to the traffic intensity for each bit rate so as to adaptively meet the variation and the unbalance in traffic intensity. Furthermore, the transmission timing of the signal frame from each base station is matched with reference to the time instant information from the GPS satellite so as to reduce the interference in the overlap area. Because of high accuracy of the time instant signal, it is possible to meet the increase in bit rate of the call signal transmitted from the base station.

Since the switching points of the bit rates are common in any of the base stations, the phases of the signals coincide with each other without any interference caused even after the bit rates are switched. In addition, phase matching of the reproducing clock pulses is carried out at every second in each base station by the use of the seconds pulses obtained from the GPS satellite. Accordingly, the phases can be matched with high accuracy for any bit rate. Furthermore, signal transmission between the central station and the base station is packetized and can therefore be carried out at a high speed as high as several times the bit rate of the call signal. Accordingly, it is possible to multiplex the call signals corresponding to a plurality of radio channels for transmission through a common transmission path from the central station to the base station. Thus, the running cost of the transmission path to the base station can be reduced. Since the call signals of the different bit rates can be transmitted through the common radio channel, a manager of the paging system can collect low-speed pagers in a reel-up fashion to accelerate the spread of high-speed pagers.

In the embodiment described in the foregoing, one signal frame is shared by three bit rates. It is noted here that no restriction is imposed on the number of types of the bit rates contained in each signal frame as far as the number not smaller than two. The timing of transmission of the leading bit of the signal frame in each base station is matched by the use of the GPS satellite system. Alternatively, phase matching can be carried out by sending a phase correction signal. In this event, phase correction of the frequency divider for producing the reproducing clocks is also carried out by the use of the phase correction signal.

According to this invention, the call signals of a plurality of the different bit rates are contained in one signal frame so that the radio channel can effectively be used. Since the bit rate switching positions can be changed in correspondence to the traffic intensity of each bit rate, variation and unbalance in traffic intensity can be adaptively dealt with. Because of coincidence of the time instant information between the central station and each base station, the interference in the overlap area can be reduced.

In addition, the current time instant is obtained with reference to the satellite signal sent from the artificial satellite and containing the time instant information. Since the time instant information has such a high accuracy, the time instant obtained in each base station can precisely be matched. It is therefore possible to reduce the interference within the overlap area. In addition, it is possible to readily acquire the transmission timing of such a high accuracy that it accommodates a high bit rate.

Further, the reference clock signal is frequency divided at the dividing ratio corresponding to the bit rate to obtain the reproducing clock signal. The frequency dividers are simultaneously reset at the predetermined interval with reference to the time instant signal. Accordingly, the phases of the clock signals can be corrected at the predetermined interval. In each base station, the frequency dividers are reset with reference to the time instant signal indicating the coincident time instant. Thus, the phases of the clock signals can be matched between the base stations in any bit rate.

Moreover, the pager establishes phase synchronization with the call signal by the use of the preamble signal. A plurality of the different bit rates which can be used by the pagers are selected at a ratio such that no erroneous synchronization is caused. Thus, when the call signals of the different bit rates are sent through the common radio channel, the pager is prevented from establishing erroneous synchronization with any bit rate different from that assigned to the pager.

Furthermore, the transmission start time instant is selected taking into consideration the time instant at which the base station can carry out transmission. Irrespective of the distance between the central station and each base station, the transmission time therebetween, and the reproduction time in each base station, transmission of the signal from each base station frame can be started at the same time instant.

What is claimed is:
1. A paging system, comprising:
a central station which includes:
call request receiving means for receiving call requests for pagers using any of a plurality of predetermined bit rates;
frame unit classifying means supplied with the call requests received by said call request receiving means for classifying the call requests into every unit to be contained in each signal frame as a transmission unit upon transmission of call signals for calling said pagers through a radio channel;
intraframe order setting means supplied with those call requests to be contained in each signal frame for ordering those call requests within each signal frame in accordance with the order of the predetermined bit rates;
bit rate switch timing calculating means for calculating, when the call signals corresponding to the call requests are produced in the order determined by said intraframe order setting means, a timing of transition of the bit rates for each transition point with a leading edge of the signal frame used as a reference point;
timer means for delivering a current time instant;
transmission start time setting means for setting, with reference to the current time instant delivered from said timer means, a transmission start time instant to start transmission of each signal frame through said radio channel; and
call request information broadcasting means for broadcasting call request information including those call requests classified for each signal frame in correspondence to the order within the signal frame, the bit rate switch timing, and the transmission start time instant of the signal frame; and
a plurality of base stations each of which includes:
call request information receiving means for receiving the call request information transmitted from said central station;
clock signal producing means for producing clock signals having frequencies corresponding to the respective bit rates possibly used by said pagers;
time instant signal producing means for producing a time instant signal coincident with the current time instant delivered from said timer means in said central station;
clock signal switching means for switching the clock signals in accordance with the order of the predetermined bit rates to select a clock signal, the switching operation being carried out every time when the bit rate switch timing indicated by the call request information comes with respect to a reference time point at which the time instant represented by the time instant signal produced by said time instant signal producing means coincides with the transmission start time instant represented by the call request information;
call signal producing means for producing, when the time instant indicated by the time instant signal produced by said time instant signal producing means coincides with the transmission start time instant indicated by the call request information, the call signals corresponding to the respective call requests in accordance with the intraframe order represented by the call request information and by the use of the clock signal selected by said clock signal switching means; and call signal transmitting means for transmitting, through said radio channel to said pagers, the call signals produced by said call signal producing means.

2. A paging system as claimed in claim 1, wherein each of said timer means and said time instant signal producing means comprises satellite signal receiving means for receiving a satellite signal transmitted from an artificial satellite and containing time instant information, and time instant information extracting means for extracting the time instant information from the satellite signal received by said satellite signal receiving means.

3. A paging system as claimed in claim 1, wherein said clock producing means comprises reference clock producing means for producing a reference clock signal used as a reference, a plurality of frequency dividing means for frequency-dividing the reference clock signal at different dividing ratios corresponding to the bit rates, and reset means for simultaneously resetting said frequency dividing means at a predetermined interval with reference to the time instant information produced by said time instant signal producing means, the clock signals produced by said frequency dividing means being corrected in phase at the predetermined interval.

4. A paging system as claimed in claim 1, wherein each of said pagers establishes phase synchronization with the call signal by the use of a preamble signal, the bit rates possibly used by said pagers being selected at a ratio such that erroneous synchronization does not occur.

5. A paging system as claimed in claim 1, wherein said transmission start time setting means selects, as the transmission start time instant, a time instant which is calculated by adding to the current time instant a time duration longer than a sum of a signal propagation delay time required in signal transmission from said central station to each base station and a processing time required for each base station to reproduce the call signals from the call request information.

* * * * *